A. T. CROSS.
STYLOGRAPHIC PEN.
No. 9,890. Reissued Oct. 11, 1881.
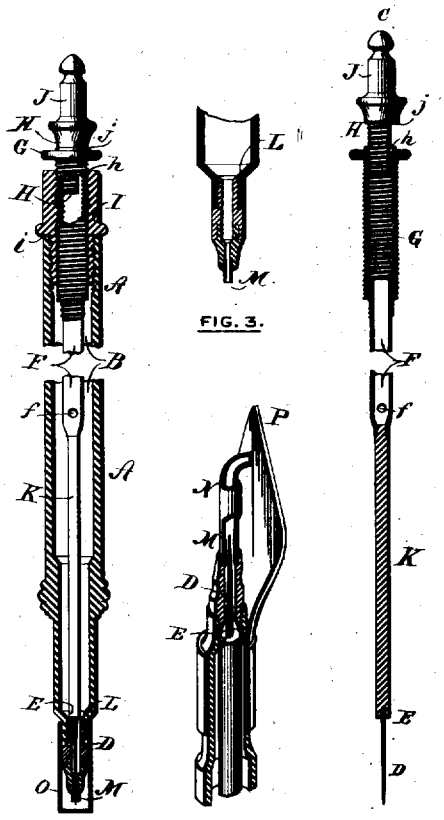
WITNESSES.
Edward Card
Socrates Schofield
INVENTOR.
Alonzo T. Cross

UNITED STATES PATENT OFFICE.

ALONZO T. CROSS, OF PROVIDENCE, RHODE ISLAND.

STYLOGRAPHIC PEN.

SPECIFICATION forming part of Reissued Letters Patent No. 9,890, dated October 11, 1881.

Original No. 189,304, dated April 10, 1877; Application filed October 28, 1879.

*To all whom it may concern:*

Be it known that I, ALONZO T. CROSS, of Providence, in the State of Rhode Island, have invented an Improvement in Fountain-Pens, of which the following is a specification.

My invention may be applied to fountain-pens either where the writing is performed by means of a tapering tubular point combined with a centrally-arranged needle or where the ordinary steel or gold pen is used; and it consists in the combination of a needle, valve, and air-tube with a cap-piece constructed with a long interior screw-thread, by means of which the adjustment of the valve and needle may be properly effected and the joint at the same time kept ink-tight. The connection between the cap and the outer case is made by a close or shoulder joint, and this cap is to be removed, with its connected needle, valve, and air-tube, in order to properly replenish the ink-chamber; and it also consists in a needle with its inclosing-tube, in combination with an ordinary writing-pen and a connecting-tube of greater diameter than the needle-inclosing tube, and also in providing the vent-screw with an extension or tip for frictionally holding the point-cap when the pen is in use.

Figure 1 is a longitudinal section, showing a fountain-pen with a tubular writing-point. Fig. 2 is a sectional view of the central needle, valve, and air-tube. Fig. 3 is an enlarged sectional view of the tubular writing-point and valve-seat. Fig. 4 is a sectional view, showing the combination of the capillary tube and needle with an ordinary writing-pen.

A is the outer case, and B the ink-chamber, which comprises the annular space between the outer case or tube, A, and the central spindle. The spindle combines in itself the needle D, valve E, air-tube F, rod K, and the adjusting-screw G, carrying at its upper end the vent-screw H.

Within the tube A is screwed the cap-piece I, having a long interior thread to receive the screw G. The cap I screws down to a shoulder, *i*, thus forming a tight joint, and the screw G is made of extra length and greased with tallow, in order that the ink may not pass, by attraction, between the threads of the cap and screw.

The screw of the vent-valve H has one side filed away, so as to leave an air-passage, *h*, along the side of the screw. This passage will be closed tight whenever the screw is screwed down to the shoulder *j*.

The screw G is made tubular and terminates in the air-tube F, at the lower end of which are located one or more orifices, *f*. To the end of the air-tube is attached the solid wire rod K, the lower end of which constitutes the valve E, closing, by the action of the screw G, down upon the conical valve-seat L.

The needle D extends below the valve E, and is made to project slightly beyond the extremity of the small tube M, which, in Fig. 1, constitutes the writing-point, and in Fig. 4 serves to deliver the ink into a tube, N, of larger diameter, and this enlargement of the tube, in combination with the projecting needle and the pen P, constitutes a very important feature of my invention, effectually preventing the clogging or obstruction of the capillary tube M.

The writing point or tube M of Fig. 1 may be made of an alloy of platinum and iridium, or of any other suitable material non-corrosive and not easily worn by being moved over a paper surface.

When the pen shown in Fig. 1 is not in use the point M is to be covered by the cap-tube O, held by friction, and upon removal from the point it may be placed for safe-keeping upon the cylindrical portion of the tip J, which is made of the proper size for this purpose.

The neeedle D, like the writing-point M, Fig. 1, may be made of an alloy of platinum and iridium, which is subject to but very slight wear from the friction of the surface of the paper, and is not acted upon by the acids contained in the ink; but other suitable material may be used, if preferred.

In order to fill the fountain or chamber B with ink the central spindle is to be entirely removed by unscrewing the cap-piece I from the outer case, A, and the ink poured into the chamber, the point M being covered by the finger or otherwise, so that the ink cannot drop therefrom. The spindle is then to be inserted and screwed down, so as to bring the needle with its point slightly projecting from the end of the tube M, and with the valve E nearly to its seat. Then upon opening the vent-passage *h*, by unscrewing the vent-screw H the pen will be ready for use, the ink flowing in proper quantity from the writing-point of the tube M. As the writing progresses the air will pass down the air-tube F and through the orifice *f* into the upper end of the chamber B above the ink, thus allowing the ink to flow from the writing-point onto the paper. When the writing is finished the valve E is to be screwed down to its seat, the vent *h* to be closed, and the cap O placed over the tube M. The pen may then be safely carried in the pocket under all circumstances.

The air-tube F should be made of capacity sufficient to contain the amount of ink forced from the chamber B by the expansion caused by extremes of heat, thus preventing the ink from being forced out at the vent *h* when the pen is in use. The natural heat of the hand imparted to the outer case, A, is sufficient to force a quantity of ink from the chamber B.

Ink is conveyed to an ordinary writing-pen, P, Fig. 4, through the bent tube N, of larger diameter than the tube M, from the end of which the needle D protrudes, and by means of the needle D the tube M may be kept free from obstruction of any kind, rendering the pen P positive and uniform in its action.

By attaching the needle, valve, air-tube, and adjusting-screw together, I am enabled to do away with the complication and expense of previous forms.

I claim as my invention—

1. The needle D, valve E, air-tube F, and vent-screw H, in combination with the cap I and outer case, A, substantially as described.

2. The needle D, tube M, and pen P, in combination with the ink-conveying tube N, of greater diameter than the tube M, substantially as described.

3. The combination of the case A, cap-piece I, adapted to screw into said case, the air-tube and spindle, and the needle D, connected directly thereto, whereby the needle may be adjusted by turning the cap-piece I, as set forth.

4. The combination of the cap-piece I, threaded as described, and fitted to the case A, the tube F, spindle K, valve E, and needle D, said valve being adapted to close upon its seat by turning the cap-piece I, as set forth.

ALONZO T. CROSS.

Witnesses:
EDWARD CARD,
HARMON S. BABCOCK.